United States Patent [19]

Nielsen, Jr.

[11] Patent Number: 4,630,456

[45] Date of Patent: Dec. 23, 1986

[54] CASKET LOCK FOR VALVE ASSEMBLY

[75] Inventor: Anker J. Nielsen, Jr., Holden, Mass.

[73] Assignee: Inner-Tite Corporation, Springfield, N.J.

[21] Appl. No.: 607,576

[22] Filed: May 7, 1984

[51] Int. Cl.$^4$ ............................................. F16K 35/00
[52] U.S. Cl. ........................................ 70/232; 70/178;
285/80; 292/307 B
[58] Field of Search ............... 70/18, 232, 177–179,
70/DIG. 57, 461; 292/307 B; 285/80

[56] References Cited

U.S. PATENT DOCUMENTS

| | | | |
|---|---|---|---|
| 1,221,354 | 4/1917 | Mitchell | 70/165 X |
| 1,480,472 | 1/1924 | Sauton | 285/80 X |
| 1,656,253 | 1/1928 | Weaver et al. | 70/18 X |
| 1,870,040 | 8/1932 | Dietze | 292/307 B |
| 2,048,424 | 7/1936 | Caldwell | 70/232 |
| 2,565,659 | 8/1951 | Kontra | 70/232 |
| 3,406,708 | 10/1968 | Maydock | 70/177 |
| 3,817,065 | 6/1974 | Sander | 70/232 |
| 4,058,328 | 11/1977 | Nickerson et al. | 285/45 |
| 4,144,729 | 3/1979 | Nielsen | 70/232 X |
| 4,407,146 | 10/1983 | Nielsen | 70/232 |

Primary Examiner—Robert L. Wolfe
Assistant Examiner—Russell W. Illich
Attorney, Agent, or Firm—McCormick, Paulding & Huber

[57] ABSTRACT

A casket lock for a gas utility valve having inlet and outlet conduits includes a pair of mating casket sections releasably connected together along a hinge about which the sections are movable between open and closed positions. In the closed position the casket sections cooperate to define a casket containing the valve and the conduit connections thereto. The casket sections are releasably retained in closed position by a fastener contained within the casket. A tubular lock secured in locked position to the casket prevents access to the fastener.

11 Claims, 7 Drawing Figures

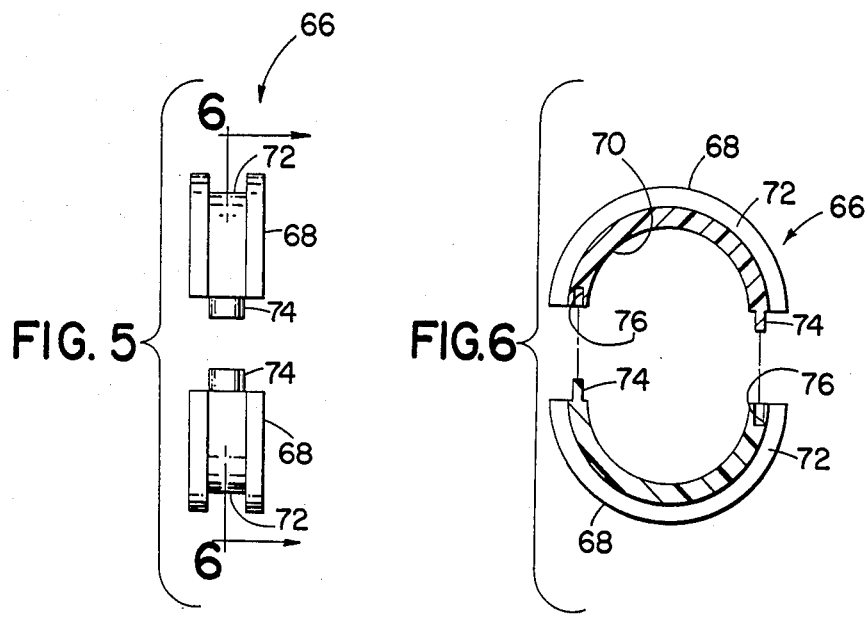
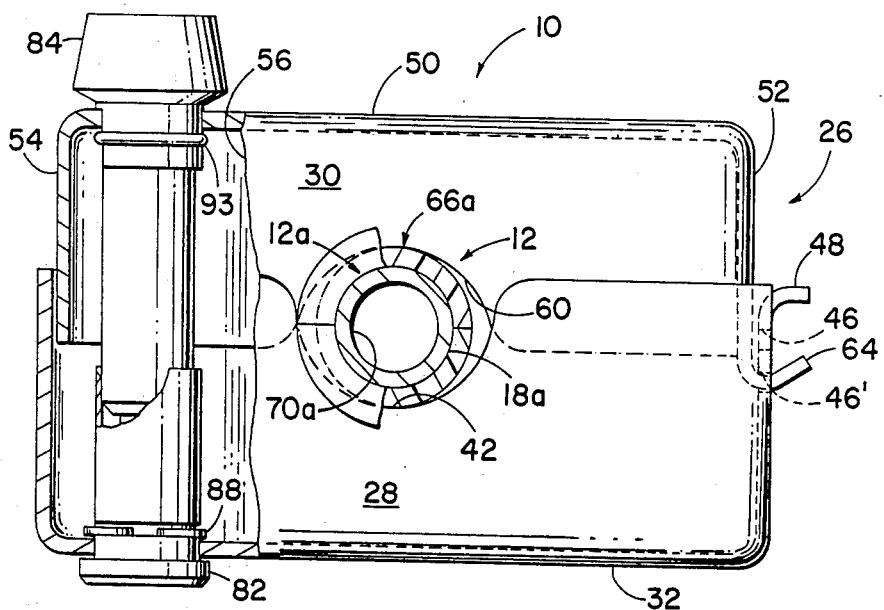

CASKET LOCK FOR VALVE ASSEMBLY

BACKGROUND OF THE INVENTION

This invention relates in general to valve securing devices and deals more particularly with a casket lock for a valve assembly such as a utility valve assembly or the like.

In a utility service for a building, as, for example, gas service for a residence, a shutoff valve is usually provided between the main gas supply line to the building and the service line within the building. If, for any reason, it becomes necessary for the utility company to terminate service to the building, it is customary to close the shutoff valve and lock it in its closed position to interrupt the flow of gas to the building. Such a valve is usually provided with a manually movable operator and means to facilitate locking the operator in closed position with a padlock or the like. However, such a locking arrangement is not entirely satisfactory, particularly with respect to a gas valve, because the locked valve and its inlet and outlet conduit connections remain exposed to tampering, which may cause gas leakage resulting in potentially serious fire and/or explosion hazards.

Accordingly, it is the general aim of the present invention to provide an improved locking device for securing a valve assembly and which prevents access to both a valve and the service connections to the valve.

SUMMARY OF THE INVENTION

In accordance with the present invention, a casket lock is provided for use with a valve assembly which includes a valve, inlet and outlet conduits and means for connecting the conduits to the valve. The casket lock comprises a pair of mating casket sections which cooperate in assembly to form a casket for enclosing the valve and the inlet and outlet connecting means. The casket sections are connected by hinge means for movement between open and closed positions and cooperate in closed position to define a casket for containing the valve and the connecting means. Openings are provided in the casket and defined by the casket sections to receive the conduits therethrough. A fastener releasably secures the casket sections in closed position. A tubular lock associated with one of the casket sections prevents access to the fastener and unauthorized opening of the casket.

At least one insulating bushing is or may be disposed within an associated one of the openings in the casket to prevent the passage of stray electrical currents through the casket between the inlet and outlet conduits of an associated valve assembly.

BRIEF DESCRIPTION OF THE DRAWINGS

FIG. 5 is an exploded side elevational view of a split insulation bushing.

FIG. 6 is an exploded sectional view through the bushing taken along the line 6—6 of FIG. 5.

FIG. 7 is similar to FIG. 2 but shows the casket lock connected to another valve assembly of somewhat smaller size, portions of the casket being broken away to reveal structure therein.

DETAILED DESCRIPTION OF PREFERRED EMBODIMENT

Figure 1:
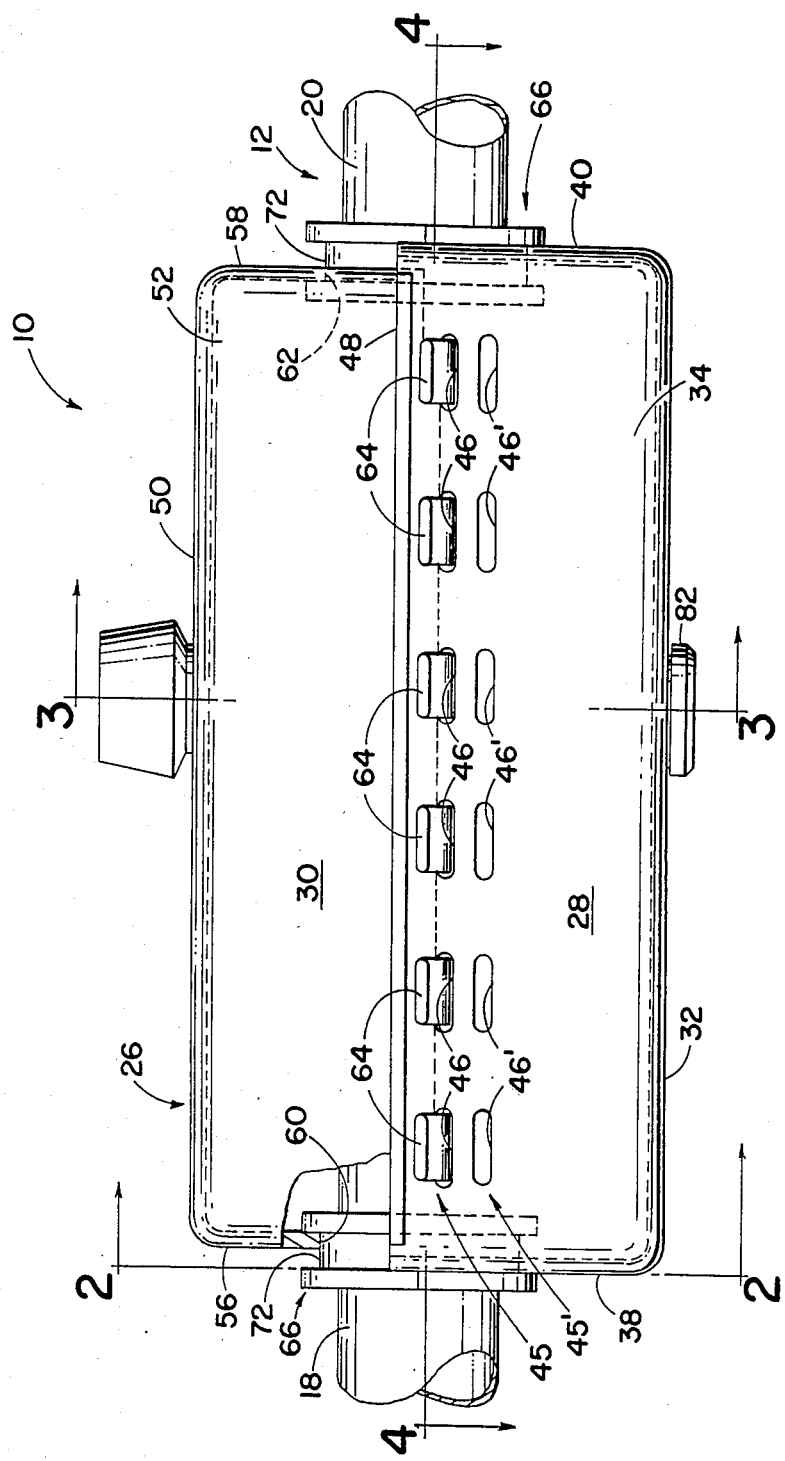
FIG. 1 is a side elevational view of a casket lock embodying the present invention and shown connected to a gas valve assembly.

The valve casket of the present invention may be used with any valve assembly which includes valve inlet and outlet conduits and means for connecting the conduits to the valve. However, in the drawings and in the description that follows, a casket lock embodying the present invention is illustrated and described with reference to a typical utility shutoff valve for interrupting residential gas service.

Figure 2:
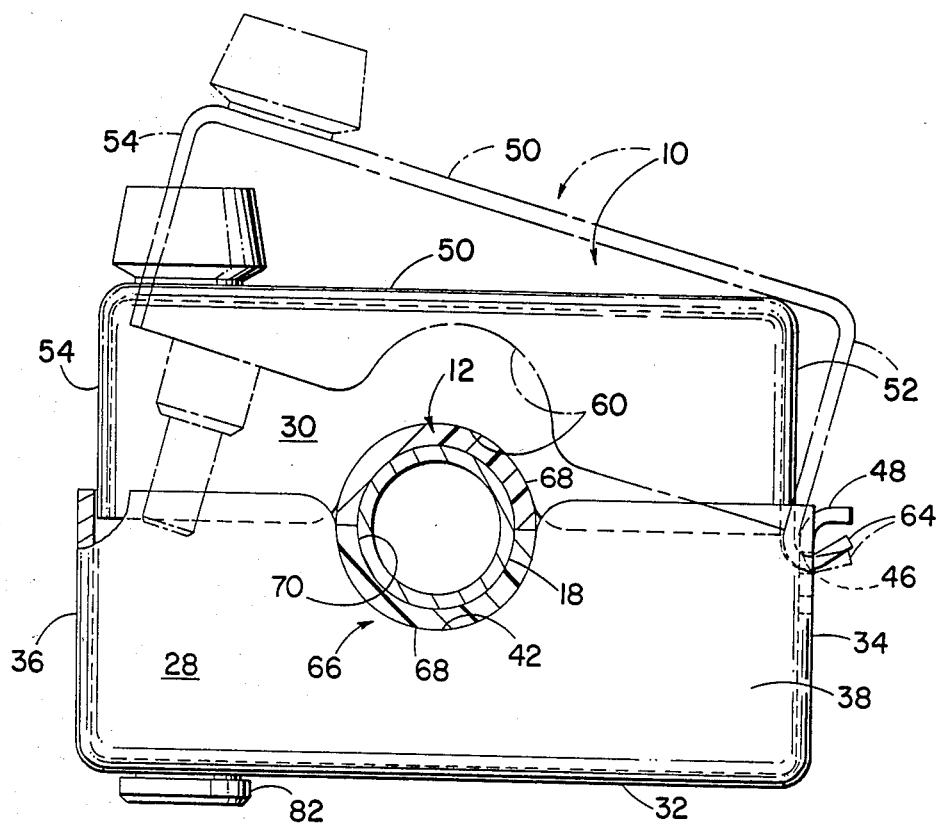
FIG. 2 is a sectional view taken along the line 2—2 of FIG. 1.
Figure 3:
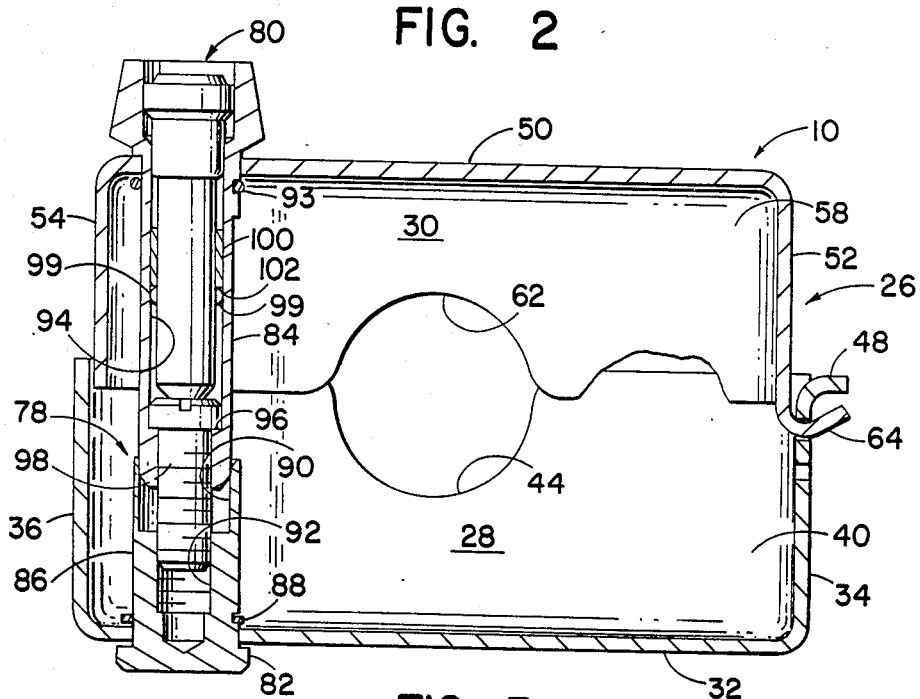
FIG. 3 is a sectional view through the casket lock taken along the line 3—3 of FIG. 1 and shown with the valve assembly removed therefrom for clarity of illustration.
Figure 4:
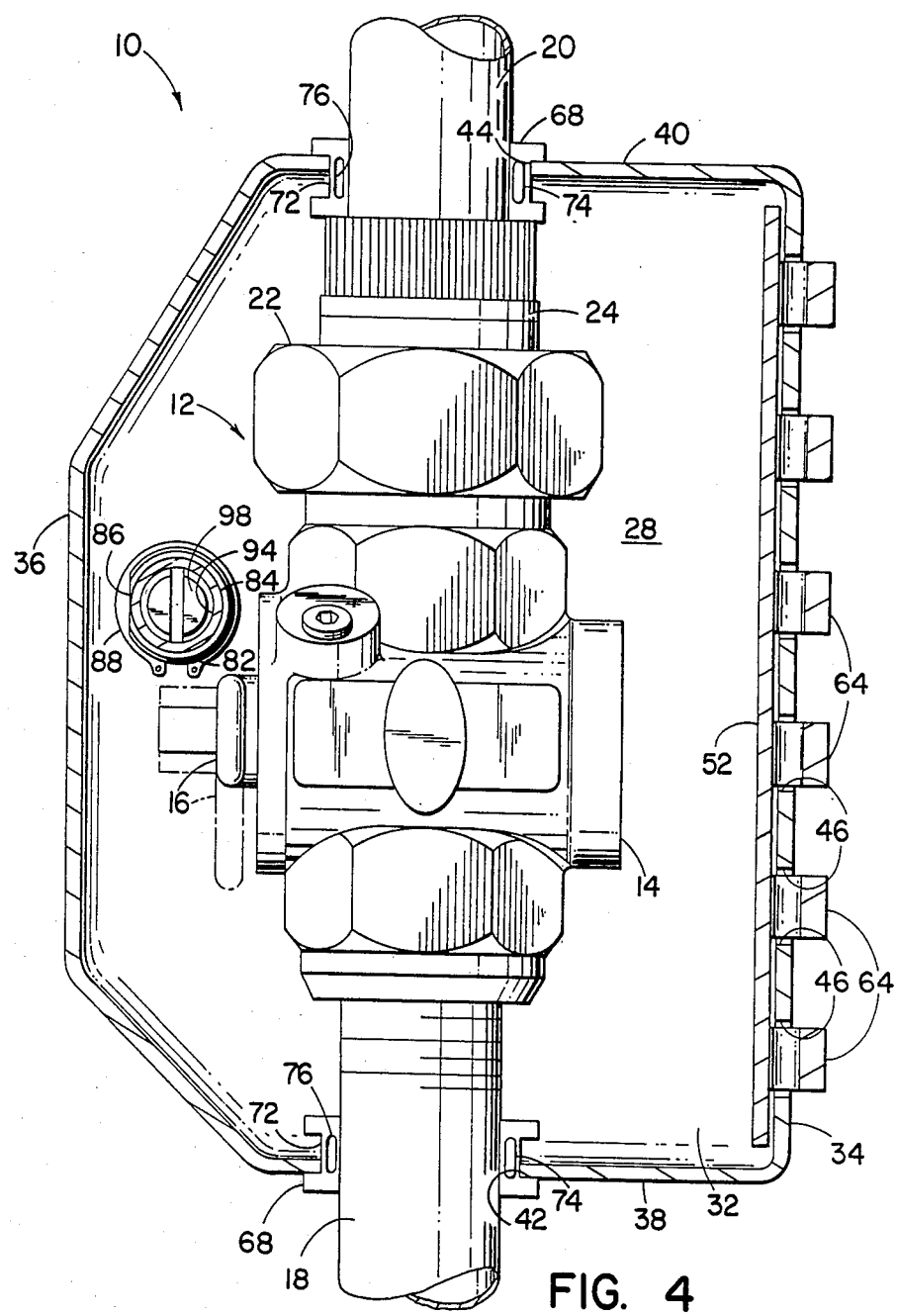
FIG. 4 is a sectional view taken along the line 4—4 of FIG. 1.

Turning now to the drawings, and referring first particularly to FIGS. 1–4, the casket lock embodying the invention is designated generally by the reference numeral 10 and shown attached to a gas shutoff valve assembly indicated generally at 12 and best shown in FIG. 4. The illustrated valve assembly 12 includes a shutoff valve 14 which has a manually operable rotary operating lever 16 movable between a closed or shutoff position shown in full lines and an open or gas flow position indicated by broken lines in FIG. 4. The assembly 12 further includes a gas inlet conduit 18 threadably connected to the valve 14 for supplying gas from an associated gas main (not shown) and an outlet conduit 20 releasably connected to the valve 14 by a coupling nut 22. A flanged insulating bushing 24 disposed between the coupling nut 22 and the outlet conduit 20 insulates the outlet conduit 20 from the valve 14 and prevents passage of stray electrical currents in either direction through the valve 14 between the inlet and outlet conduits 18 and 20 in a manner well known in the art.

The casket lock of the present invention may be attached to a valve assembly having any orientation, however, for convenience the casket lock is illustrated, described and claimed with reference to the horizontally oriented valve assembly 12 shown in the drawings.

Considering now the casket lock 10 in further detail, it essentially comprises a casket indicated generally at 26 which includes a lower casket section 28 and an upper casket section 30. The shape of the casket may vary but is determined, at least to some degree, by the physical characteristics of the valve assembly to be housed within it. However, the illustrated casket 26 is generally rectangular and has openings for receiving the inlet and outlet conduits 18 and 20, therethrough, as will be hereinafter more fully discussed.

The lower casket section 28 is open at its upper end and includes a bottom wall 32, sidewalls 34 and 36, and end walls 38 and 40. Upwardly opening cutout portions 42 and 44 are formed in the end walls 38 and 40, respectively, as best shown in FIGS. 2 and 3. Preferably, and as shown, the cutout portions are generally parti-circular and each cutout portion has a radius somewhat larger than the radius of the associated cylindrical conduit to be received therein.

At least one horizontal row of apertures indicated generally at 45, which includes spaced apart apertures or horizontal slots 46, 46, is formed in an upper portion of the sidewall 34, as best shown in FIG. 1. However, the illustrated lower casket section 28 has another horizontal row of apertures indicated generally at 45' and which includes spaced apart apertures or slots 46', 46', for a purpose which will be hereinafter discussed. The upper marginal portion of the sidewall 34 is turned outwardly to form a horizontally disposed lip 48 which extends generally along the length of the sidewall 34 above the upper row of slots 45, as best shown in FIGS. 2-4.

The upper casket section 30 is generally similar to the lower casket section 28, but of slightly smaller size. More specifically, the horizontal outside dimensions of the upper casket section 30 are generally equal to the horizontal inside dimensions of the lower casket section 28. The upper casket section has a top wall 50, sidewalls 52 and 54, and end walls 56 and 58. Downwardly opening cutout portions 60 and 62, similar in configuration to the cutout portions 42 and 44, are formed in the end walls 56 and 58, respectively. A horizontally spaced apart series of hinge members or prongs 64, 64, equal in number to the slots in an associated one of the rows 45, 45', extend outwardly and upwardly from the lower portion of the sidewall 52, as best shown in FIGS. 2 and 3. The prongs 64, 64 are adapted to be received within and generally complement associated portions of the slots of an associated row and cooperate with the slots in that row to releasably retain the lower and upper casket sections 28 and 30 in assembled relation for hinged movement between open and closed positions. In FIG. 2 the two upper and lower casket sections are shown in full lines in closed position and in broken lines in a partially open position. In the closed position, the lower part of the upper casket section 30 is received in telescopic relation within the upper part of the lower casket section 28, so that associated upper and lower marginal portions of the two casket sections are disposed in generally overlapping relation to each other, as best shown in FIGS. 2 and 3.

As previously noted, the valve assembly 14 is electrically insulated from the outlet conduit 20 by the bushing 24 to prevent electrical continuity through the valve 14 between the inlet conduit 18 and outlet conduit 20. To preserve the integrity of this electrical isolation between the inlet and outlet conduits, at least one dielectric insulating bushing is provided and indicated generally at 66 to electrically insulate the casket 26 from an associated one of the conduits. However, in the presently preferred embodiment of the invention, two such insulating bushings 66, 66 are provided and insulate the casket 26 from each of the conduits 18 and 20.

Referring now particularly to FIGS. 6 and 7, a typical annular insulating bushing 66 is shown. The illustrated bushing 66 is made from a suitable dielectric plastic material and is preferably split, being formed by substantially identical half-sections 68, 68, so that it may be installed on an existing valve assembly, such as the assembly 12, without disconnecting either conduit 18 or 20 from the valve 14. The bushing 66 is generally cylindrical and has a cylindrical bore 70, the diameter of which is substantially equal to the outside diameter of an associated conduit on which it is to be received. A radially outwardly opening annular groove 72 formed in the bushing 66 defines flanges on the bushing and receives associated portions of the end walls of the upper and lower casket sections, as best shown in FIGS. 1 and 5. Each halfsection 68 has a projecting tab 74 and a generally complementary recess 76 for receiving the tab 74 of the mating half-section in press fit relation therein. The tabs 74, 74 cooperate with the recesses 76, 76 to releasably retain the bushing 66 in assembly with an associated conduit.

A fastener assembly, indicated generally at 78 and an associated tubular lock, designated generally by the numeral 80 in FIG. 3, cooperate to lock the two casket sections in closed assembled relation with the valve assembly 12 so that the valve 14 and the conduit connections to it are wholly enclosed within the casket formed by the assembled sections. The tubular lock 80 is substantially identical to the lock illustrated and described in my U.S. Pat. No. 4,289,000 for PICK RESISTANT TUBULAR LOCK AND KEY FOR OPERATING SAME, issued Sept. 15, 1981, and will not be described in detail. However, for a more complete disclosure of such a lock reference may be had to my aforementioned U.S. patent, which is hereby adopted by reference as part of the present disclosure.

Further referring to FIG. 3, the fastener assembly 78 includes a lower fastener member 82 associated with the lower casket section 28 and an upper fastener member 84 associated with the upper casket member 30. The lower fastener member 82 has a generally cylindrical body with a flat surface 86 formed on one side thereof, shown in FIG. 4, and a diametrically enlarged head at its lower end. The body extends upwardly through an aperture of complementary cross-section formed in the bottom wall 32 whereby it is retained against rotation relative to the lower casket member 28 by the flat surface 86. A snap ring 88 received within an annular recess in the body retains the lower fastener member 82 in assembly with the lower casket section 28. An upwardly opening stepped blind bore 90, formed in the lower fastener portion substantially as shown in FIG. 3, has a diametrically reduced threaded portion 92 near its lower end.

The upper fastener member 84 has a generally cylindrical body with an enlarged head at its upper end. The body extends downwardly through a complementary aperture in the top wall 50. A flat formed on the body cooperates with an associated flat defined by the aperture in the top wall to retain the upper fastener member 84 in non-rotatable relation with the upper casket section 30. An O-ring 93 engaged within an annular recess in the body retains the upper fastener member 84 in assembly with the upper casket section 30. The upper fastener member 84 has a stepped cylindrical bore 94 extending coaxially through it. At its lower end the bore 94 has a diametrically reduced portion which defines an upwardly facing shoulder 96 for engaging the head of a fastener 98 contained within the bore. A cylindrical sleeve 100 press fitted or otherwise secured within the bore 94 in axially spaced relation to the shoulder 96 defines a downwardly facing shoulder 102 which serves to prevent separation of the fastener 98 from the upper casket section. The shoulder 102 also cooperates in locking relation with the tubular locking member 80 to releasably retain the locking member within the upper fastener member 84. When the casket 26 is in its closed position, the lower end portion of the upper fastener member 84 extends for some distance into the upper end portion of the lower fastener member 82. The upper and lower fastener members cooperate to align the fastener 98 with the threaded opening 92.

When it becomes necessary to terminate utility service to a building served by the valve assembly 12, the rotary operating lever 16 is first rotated from its open or broken line position to its closed or full line position of FIG. 4 to interrupt gas flow from the inlet conduit 18 to the outlet conduit 20. Split insulating bushings 66, 66, are next assembled on the inlet and outlet conduits 18 and 20. Each bushing 66 is formed by assembling a pair of bushing half-sections 68, 68. More specifically, the tab 74 on each bushing half-section 68 is forceably inserted into the recess 76 in the other of the half-sections, whereby each bushing is releasably secured to an associated conduit. The lower casket section 28 is now positioned so that associated edge portions of the end walls 38 and 40 are disposed within the annular grooves 72, 72 in the bushings 66, 66. The bushings are then pressed axially inwardly and toward each other so that the outer flange on each bushing engages an associated end wall of the lower casket section. The prongs 64, 64 are next engaged in the slots of the upper row 45. The upper casket section or cover may now be hinged to closed position relative to the lower casket section to enclose the valve assembly 12 therein. Closing the casket brings the upper fastener member 84 into generally coaxial alignment with the lower fastener member 82 and automatically aligns the threaded fastener 98 with the threaded opening 92. A screwdriver may be inserted into the open upper end of the bore 94 to thread the fastener 98 into engagement with the threaded opening 92. Since the fastener 98 is located on the opposite side of the coaxially aligned conduits 18 and 20 from the hinge, the bushings 66, 66 serve as fulcrums and cause the hinge prongs 64, 64 to move in an upward direction when the fastener 98 is tightened, thereby causing the prongs to engage the upper edges of the associated slots 46, 46. Ultimately, the two casket sections are brought into engagement with the bushings 66, 66 which clamp the casket in stationary position relative to the valve assembly 12. The casket lock assembly is completed by forcedly inserting the tubular lock 80 into the bore 94 which forces radially projecting balls 99, 99 on the lock radially inwardly until the balls pass the constriction formed by the sleeve 100. When the balls are disposed below the locking shoulder 102, the casket 26 is locked, as it is shown in FIG. 3. The tubular lock 80 prevents access to the fastener 98 so that the casket 26 cannot be opened without first removing the lock 80 from the bore 94, which requires a special expandable key (Not Shown). The lip 48 prevents the hinge prongs from being attacked, as by pounding or hammering.

In FIG. 7 the casket lock 10 is shown fitted with a somewhat smaller bushing indicated generally at 66a and adjusted to accommodate a valve assembly 12a which includes a valve and conduits of somewhat smaller size than those of the valve assembly 12. The bushing 66a has a bore 70a, the diameter of which is substantially equal to the diameter of the illustrated conduit 18a on which it is received.

When the casket sections 28 and 30 are assembled with the smaller bushing 66a, the hinge prongs 64, 64 are engaged within the slots of the lower row 45'. Thus, when the casket sections are assembled to encase the smaller valve assembly 12a, there will be substantially greater overlap between the casket section marginal portions and the associated end portions of the tubular fastener members 82 and 84, thereby providing a greater degree of security and resistance to attack.

The invention has been illustrated and described with reference to a casket lock for a gas valve, however, it should be understood that the valve casket of the present invention may be adapted to accommodate other types of valve structures and the like, as, for example, gas, liquid, or electrical valves, and modified forms of the present casket lock to accommodate such structures are contemplated within the scope of the invention.

I claim:

1. A casket lock for a valve assembly including a valve, coaxially aligned generally cylindrical inlet and outlet conduits extending in axially opposite directions from said valve, and connecting means for securing the conduits to the valve, said casket lock comprising a pair of telescopically mating casket sections having open and closed positions, one of said casket sections having a marginal portion telescopically received within an and in overlapping relation with an associated marginal position of said other of said casket sections when said casket sections are in said closed position, adjustable hinge means for connecting said casket sections together to move about a hinge axis between said open and closed positions and including a plurality generally paralled rows of apertures formed in a marginal edge portion of one of said casket sections and a row of spaced prongs integrally connected to and projecting form a marginal edge portion of the other of said casket sections for positioning within the apertures of a selected one of said rows, said prongs projecting outwardly from within said casket through said apertures of said selected one of said rows when said casket sections are in said closed position, each of said casket sections having cutout portions at its opposite ends in generally opposing relation to said cutout portions in the other of said casket sections, said cutout portions cooperating in said closed position to define a pair of coaxially aligned generally circular openings of adjustable size in said casket at axially opposite ends of said casket and disposed in axially parallel alignment with said hinge axis for receiving the inlet and outlet conduits of an associated valve assembly therethrough, said casket sections cooperating in said closed positions to define a casket for containing the valve and the connecting means, said openings receiving the inlet and outlet conduits therethrough when said casket sections are in said closed position, and locking means including a fastener within said casket for releasably securing said casket sections in said closed position and a lock for preventing access to said fastener when said casket sections are secured in said closed position by said locking means, said adjustable hinge means and said locking means cooperating to define means for adjusting the size of said openings to receive conduits of differing size.

2. A casket lock for a valve assembly including a valve, coaxially aligned generally cylindrical inlet and outlet conduits extending in axially opposite directions from the valve, and connecting means for securing the conduits to the valve, said casket lock comprising a pair of telescopically mating casket sections, adjustable hinge means releasably connecting said sections for movement about a hinge axis between open and closed positions, said casket sections in said closed position cooperating to form a casket for containing the valve and the connecting means, each of said casket sections having cutout portions at its opposite ends in generally opposing relation to said cutout portions in the other of said casket sections, said cutout portions cooperating in said closed position to define a pair of coaxially aligned generally circular openings of adjustable size in said casket at axially opposite ends of said casket and disposed in axially parallel alignment with said hinge axis for receiving the inlet and outlet conduits of an associated valve assembly therethrough, said casket sections having marginal portions disposed in overlapping relation to each other in said closed position, said adjustable hinge means including a plurality generally parallel rows of apertures formed in a marginal portion of one of said casket sections and a row of spaced prongs integrally connected to and projecting from a marginal edge portion of the other of said casket sections for positioning within the apertures of a selected one of said rows, said prongs projecting outwardly from within said casket through said apertures of said selected one of said rows when said casket is in its closed position, and means for locking said casket in said closed position including a pair of axially elongated fastener members, each of said fastener members attached to an associated one of said casket sections, said fastener members being generally coaxially aligned and having associated end portions disposed in telescopic relationship to each other within said casket when said casket sections are in said closed position, one of said fastener members having a bore opening externally of said casket, the other of said fastener members having a threaded opening therein, a threaded fastener disposed within said one fastener member for threadably engaging the threaded opening in said other fastener member when said casket sections are in closed position to secure said casket sections in said closed position, and a tubular lock having open and locked conditions received within said bore and having a portion thereof engaged with said one fastener member in said locked condition to prevent access to said threaded fastener, said adjustable hinge means and said locking means cooperating to define means for adjusting the size of said openings to receive conduits of differing size.

3. A casket lock as set forth in claim 2 wherein said hinge means comprises means for releasably connecting said casket sections.

4. A casket lock as set forth in claim 2 wherein said marginal portion of said one casket section has an outwardly turned lip thereon extending along the entire length of said rows in generally parallel relation to said rows.

5. A casket lock as set forth in claim 2 wherein said hinge means and said locking means are disposed to opposite sides of the axis of said openings.

6. A casket lock as set forth in claim 2 wherein said valve assembly includes first insulating means for electrically insulating one of the conduits from the valve to prevent the passage of stray electrical currents through the valve between the one conduit and the other of the conduits and said casket lock includes second insulating means for electrically insulating said casket from at least one of the conduits.

7. A casket lock as set forth in claim 6 wherein said second insulating means comprises at least one annular bushing of dielectric material disposed within an associated one of said openings and surrounding an associated portion of the one conduit.

8. A casket lock as set forth in claim 7 wherein said annular bushing comprises a split bushing formed by substantially identical half-sections.

9. A casket lock as set forth in claim 8 wherein said bushing has an annular outwardly opening groove and associated portions of said casket sections are disposed within said groove when said casket sections are in closed position.

10. A casket lock as set forth in claim 2 wherein the valve assembly includes means for electrically insulating one of the conduits from the valve to prevent passage of stray electrical currents from one of said conduits through the valve and to the other of the conduits, said casket lock having means for insulating said casket lock from said conduits including a pair of split insulating bushings, each of said bushings including substantially identical half-sections and means for releasably retaining said half-sections in assembly with an associated conduit whereby the bushing formed by said half-section surrounds said associated conduit, each of said bushing having an annular outwardly opening groove therein, each of said bushings being disposed in an associated one of said openings and being retained in assembly with said casket by portions of said casket sections disposed within said groove.

11. A casket lock as set forth in claim 10 wherein said locking means is disposed to the opposite side of the axis of said openings from said hinge means and said bushings define fulcrums for cooperating with said cutout portions to cause said hinge prongs to tightly engage associated walls of said apertures when said threaded fastener is tightened.

* * * * *